United States Patent
Malatesta (10) Patent No.: US 7,185,748 B2
(45) Date of Patent: Mar. 6, 2007

(54) OBJECT TRANSPORT AND SORTING ASSEMBLIES AND METHODS

(75) Inventor: James Malatesta, Hockessin, DE (US)

(73) Assignee: Tritek Technologies, Inc., Hockessin, DE (US)

( * ) Notice: Subject to any disclaimer, the term of this patent is extended or adjusted under 35 U.S.C. 154(b) by 124 days.

(21) Appl. No.: 11/078,241

(22) Filed: Mar. 11, 2005

(65) Prior Publication Data

US 2005/0205387 A1    Sep. 22, 2005

Related U.S. Application Data

(60) Provisional application No. 60/552,343, filed on Mar. 11, 2004.

(51) Int. Cl.
B65G 11/04 (2006.01)
(52) U.S. Cl. .............................. 193/8; 406/88; 209/900
(58) Field of Classification Search ............ 198/369.1, 198/367, 359, 360, 370.01, 370.11; 193/2 R, 193/8, 23, 29; 209/900; 406/86, 88, 94
See application file for complete search history.

(56) References Cited

U.S. PATENT DOCUMENTS

| | | | | |
|---|---|---|---|---|
| 1,126,977 A | * | 2/1915 | Gargam et al. | 193/8 |
| 3,937,456 A | * | 2/1976 | Gruodis et al. | 193/8 |
| 4,925,002 A | * | 5/1990 | Williams | 209/900 |
| 4,978,253 A | | 12/1990 | Lazzari | |
| 5,104,607 A | | 4/1992 | Driska | |
| 5,226,547 A | | 7/1993 | Malatesta | 209/657 |
| 5,718,321 A | * | 2/1998 | Brugger et al. | 209/900 |
| 6,371,275 B1 | * | 4/2002 | Terrell et al. | 198/367 |

* cited by examiner

Primary Examiner—James R. Bidwell
(74) Attorney, Agent, or Firm—Schnader, Harrison, Segal & Lewis, LLP (57) ABSTRACT

An object sorting apparatus and method using chutes for transporting objects to selected locations. The chutes include one or more openings through which a fluid may be forced to reduce friction between the objects and the chute. Diverters are operatively aligned with the chutes for directing the objects to selected chutes. A momentum mechanism imparts forward motion to the objects to move them along the chutes along the chutes.

40 Claims, 6 Drawing Sheets

OBJECT TRANSPORT AND SORTING ASSEMBLIES AND METHODS

This application is based, and claims priority to, provisional application having Ser. No. 60/552,343, having a filing date of Mar. 11, 2004, entitled Object Transport and Sorting Assemblies.

The invention relates to machines used for objects. The invention eliminates all or some conveyor belts and pinch belts that are typically used in these machines. Other transport mechanisms, such as compression wheels, may also be eliminated by the present invention Use of conveyor belts, pinch belts and compression wheels in sorting machinery has many disadvantages. First, such devices apply significant pressure on objects and cannot easily accommodate objects of varying sizes. Second, belts tend to wear and must be replaced regularly. A worn belt may cause a machine to malfunction. Another disadvantage of using belts as a transport mechanism is that standard sizes vary between countries. Therefore, a machine that is marketed in the United States as well as other countries requires different specifications. The present invention may reduce these problems associated with the use of belts or other transport mechanisms.

DESCRIPTION OF THE DRAWINGS

The invention is best understood from the following detailed description when read with the accompanying drawings.

DESCRIPTION OF THE INVENTION

Embodiments of the present invention allow the use of forced fluid to transport objects for sorting, thereby eliminating or reducing the need for belts, compression wheels or other transport devices. The present invention can be implemented, for example, to transport and sort a letter-size envelope and a telephone book in the same apparatus. This would be virtually impossible with traditional machines, such as that which is disclosed in U.S. Pat. No. 5,226,547.

Embodiments of the present invention are particularly suitable for use with a mail sorting apparatus, and will therefore, primarily be described in such an embodiment. It is noted, however, that the same principles by which mail can be conveyed using jets of air or other fluids can be applied to documents, packages, and numerous other objects. "Jets" as used herein include any fluid forced through any type of opening that changed the pressure of the fluid and is not limited to, but can include, use of nozzles.

An illustrative embodiment of the invention includes transporting objects on a surface through which a fluid, such as air, is forced. Preferably the surface contains numerous openings through which the fluid is forced. The desired direction of transport may be achieved by positioning the surface on an incline. The force of the fluid against the object reduces the friction between the object and the transport surface, while the incline allows gravity to transport the object in the desired direction. Forces other than gravity may be used to provide the necessary momentum.

Objects may also be transported on horizontal surfaces by imparting momentum in the desired direction. Examples of ways to impart such momentum include, but are not limited to, directing the fluid jets in an appropriate direction such as toward a discharge end of a chute, varying the force of the fluid jets, imparting an initial momentum on the object by releasing it onto the transport surface with momentum, vibrating the transport surface and use of magnetism to direct objects. A combination of these momentum generating mechanisms may also be used. Therefore, when it is stated herein that a particular mechanism "imparts" momentum to an object" it is not limited to that being the sole mechanism.

The transport surfaces are preferably aluminum but may be made of any other materials that can be machined as desired. Further illustrative examples are other metals, and plastics. Metals may be Teflon®-coated or coated with other materials to reduce friction and wear. It is noted, however, that as objects ride on top of the fluid, additional friction-reducing materials such as Teflon® may not be necessary.

In an exemplary embodiment of the invention, the transport surface has an enclosed chamber beneath it into which the fluid is forced that will ultimately be released through the openings on the transport surface. In an illustrative example, the chamber has a depth in the range of 0.75" to 1.0". The chamber depth, however, may depend on numerous factors, such as the size of objects being transported, the transport surface materials and the fluid pressure. For most applications the depth may be in the range of 0.25" to 2.0". Furthermore, the chamber may be compartmentalized, or a single chamber may span more than one chute.

Figure 1:
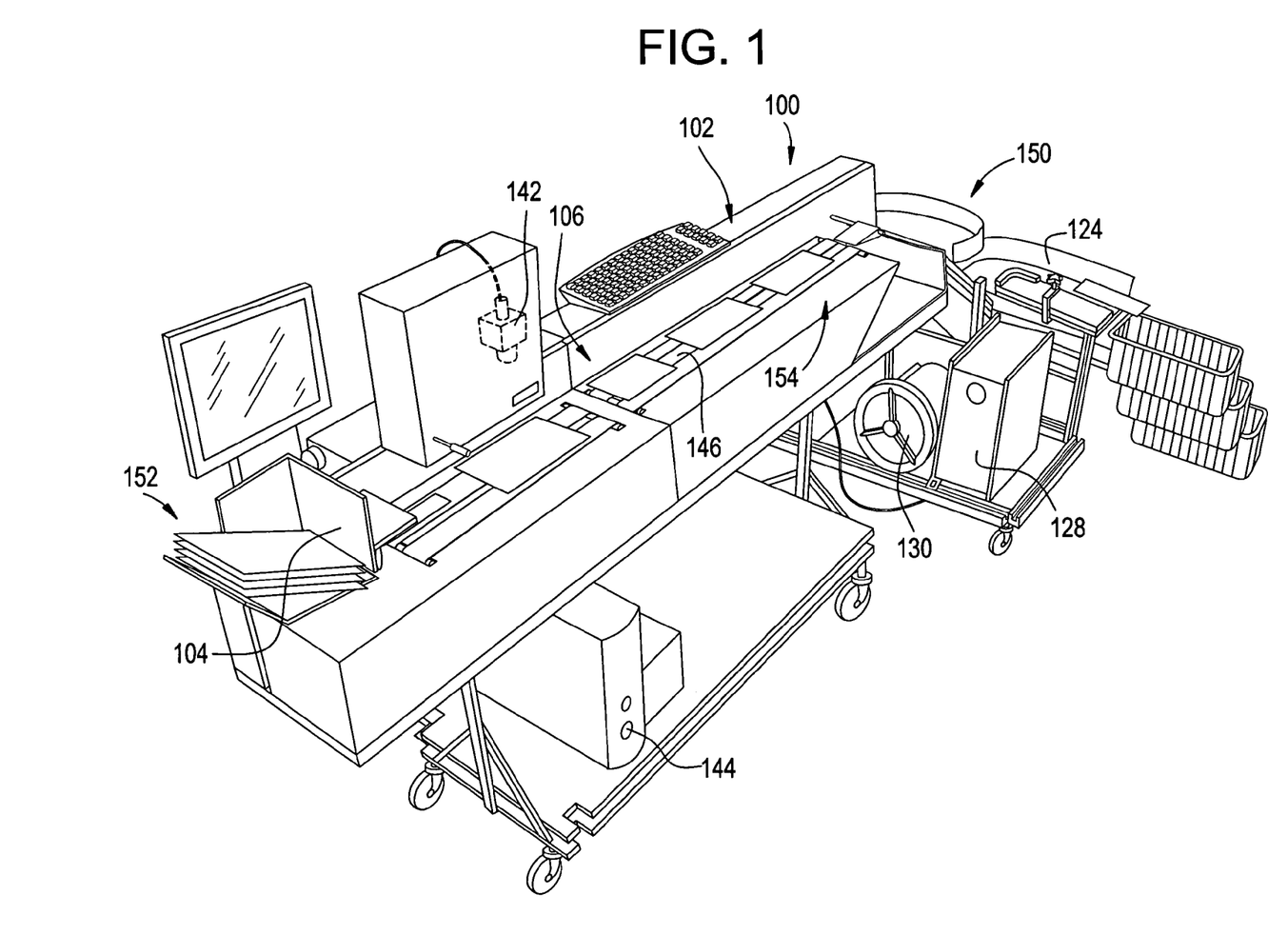
FIG. 1 depicts an object sorting apparatus according to an illustrative embodiment of the invention.

The invention will now be described as it relates to mail sorting machines. FIG. 1 depicts a mail sorting assembly 100 according to an illustrative embodiment of the invention. Mail sorting machine 100 includes both conveyor belts and chutes, but can be constructed to eliminate all belts. Mail sorter 100 includes a mail feeder assembly 102 to transport mail to achute assembly 150. Mail feeder assembly 102 includes a mail holding section 104 at an intake end portion 152 of assembly 102 wherein mail may be stacked and allowed to enter mail transport section 106. In the embodiment depicted in FIG. 1, mail transport section 106 is depicted as having belts 146 to transport mail. It is envisioned that these transport belts may be replaced by a system wherein the mails would ride on a fluid cushion. Mail feeder assembly 102 has a discharge end portion 154 where objects leave the feeder assembly section to enter the chute portion of the apparatus.

Figure 5:
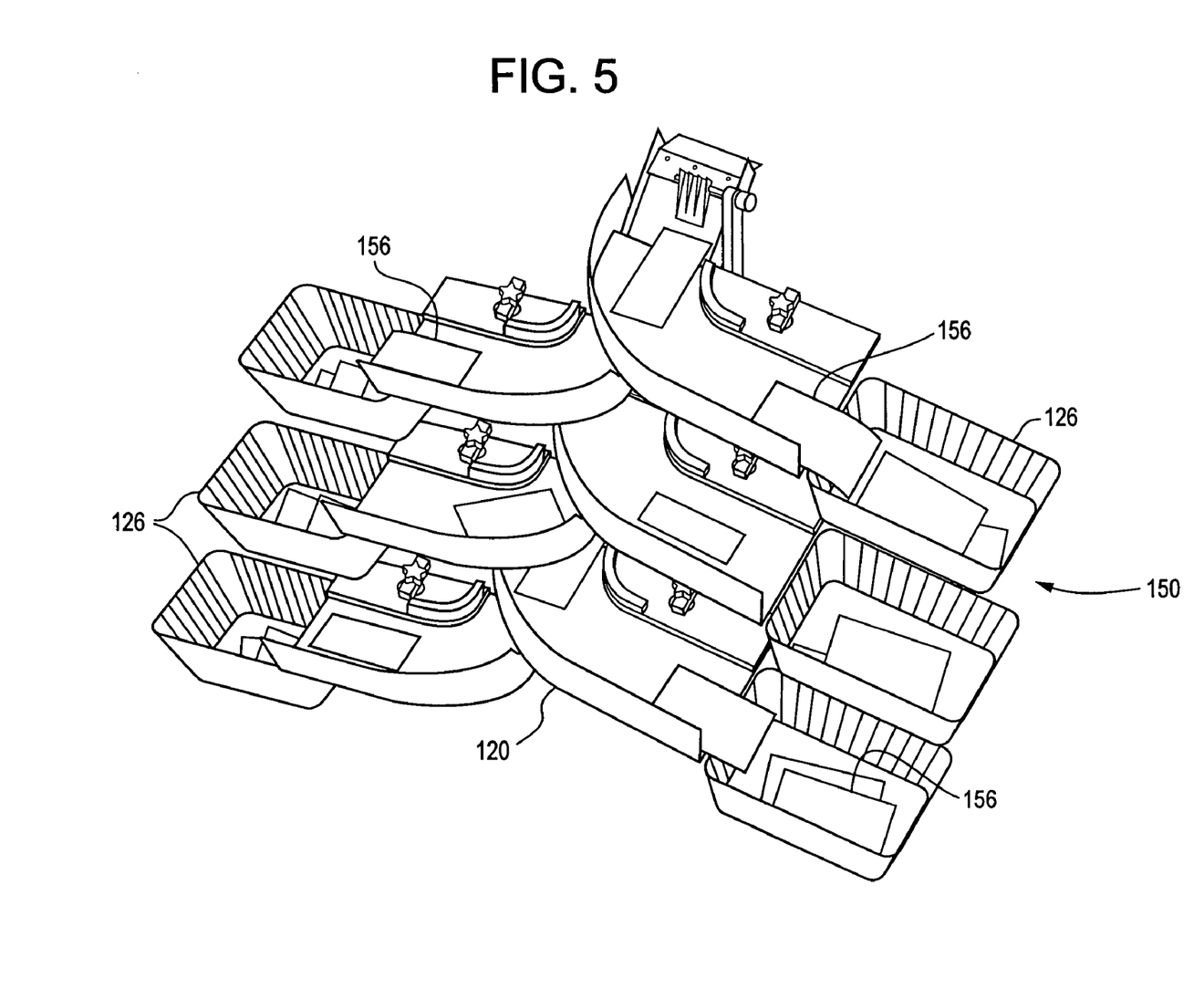
FIG. 5 depicts the chute section of the document processing machine of FIG. 1.

A reader 142 scans and/or reads information on the mail, which is input to computer 144. Scanning and/or reading may include detection of the presence of information such as a marking. Computer 144 includes applications that analyze the data provided by reader 142 and uses this information to direct the mail to appropriate paths or bins. When it is stated herein that an object is directed to a path, chute, bin, etc, it does not mean that that location is necessarily the ultimate resting place of the object. Mail is transported from feeder assembly 102 to chute assembly 150. FIG. 5 depicts an illustrative embodiment of a chute assembly 150 transporting mail 156 along chutes 120 to bins 126.

The system and associated process may also include, in addition or opposed to scanning, printing information from a database on objects and using the same database information to direct the objects toward particular chutes.

Figure 2:
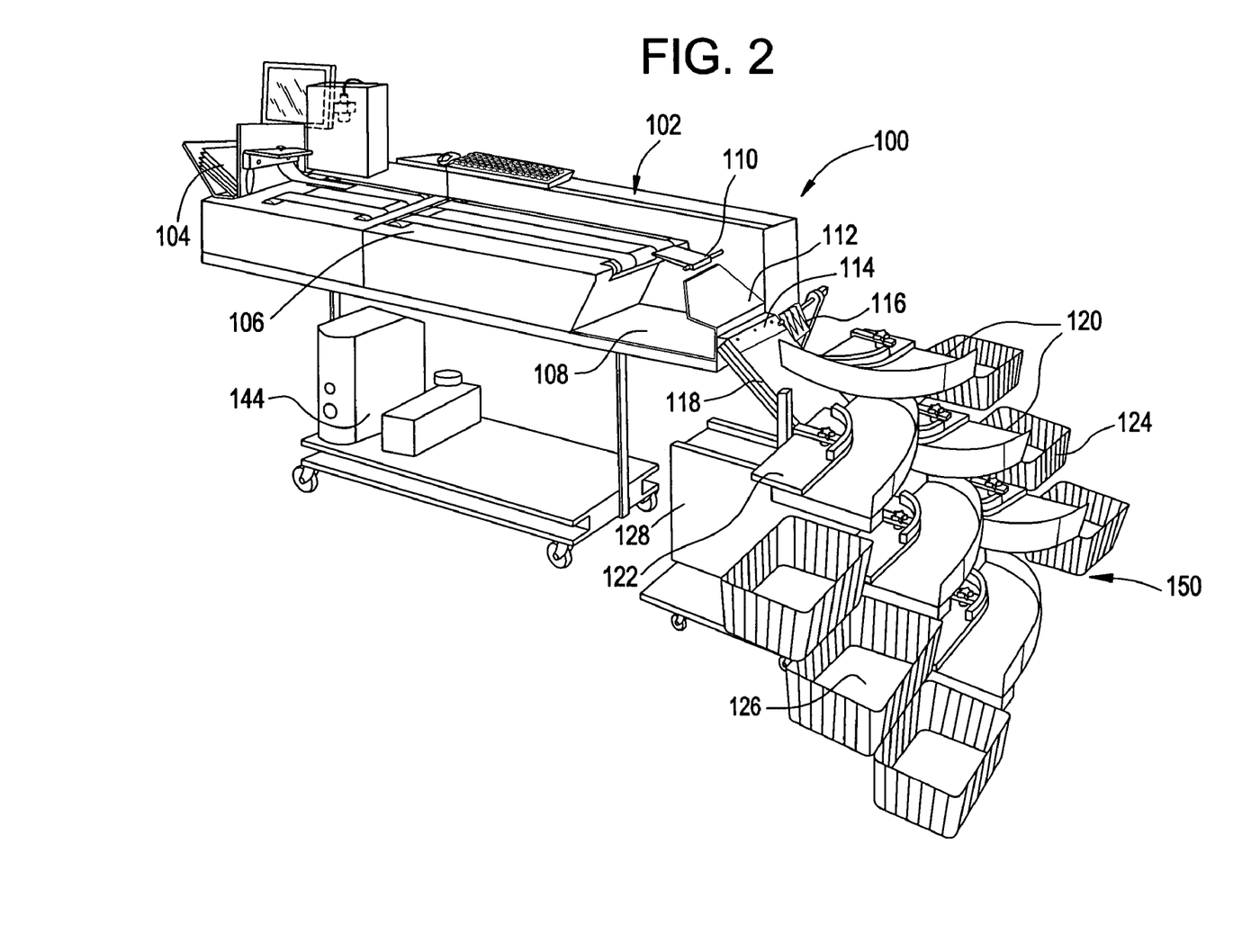
FIG. 2 depicts another view of the illustrative object sorting apparatus of FIG. 1.
Figure 4A:
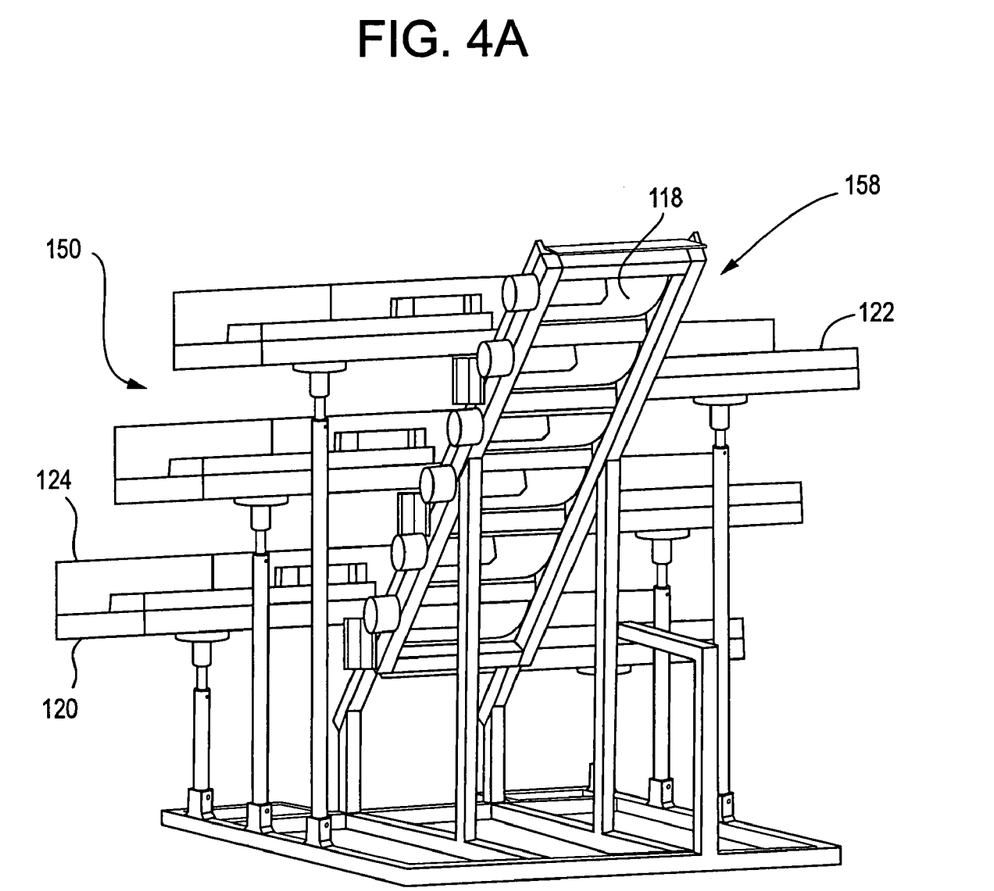
FIGS. 4A–B depict two views of an illustrative embodiment of the chute section of the sorting apparatus of FIG. 1.
Figure 4B:
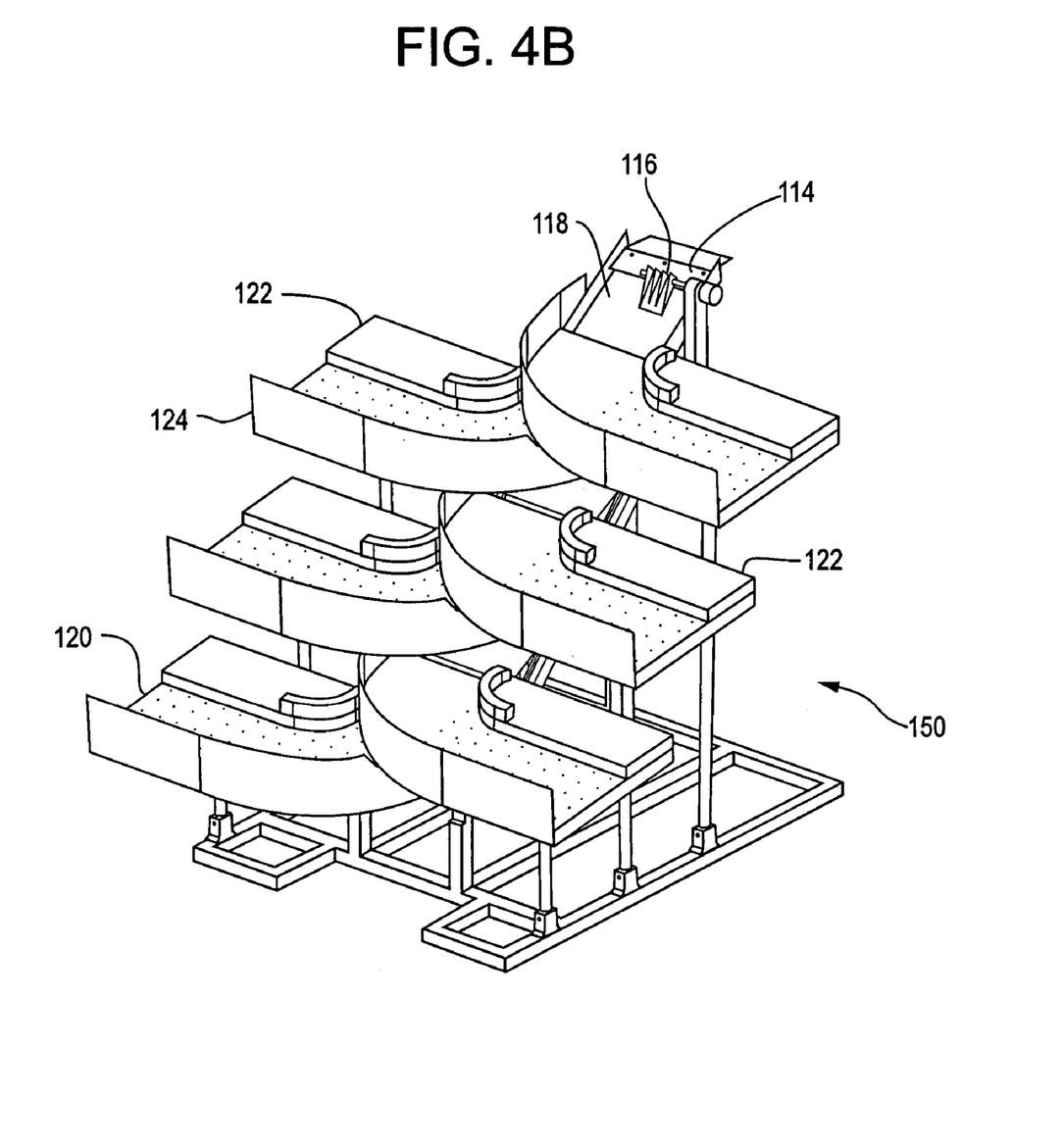

FIGS. 2 and 4A–B depict chute assembly 150, which may include a plurality of receptacles 126 into which mail may be sorted. Computer 144 regulates various components in the mail sorting system 100 to direct mail to the plurality of receptacles 126 and reject bins, such as bin 108. Computer 144 sends signals to a controller housed in housing 128, which controls various diverting components based on information from reader 144. The diverting components may be regulated by a valve or switching means such as a solenoid. A reject diverting flap 110 is shown at the downstream end of transport belts 146, and will fold either upward or downward to allow mail to enter a first receptacle 108, which in this example serves as a reject bin. Mail may be rejected if the system could not determine to which chute it should be directed, for example, if an address could not be read on the mail or the address read is not in the sorting apparatus database.

Slide 112 causes mail to be directed toward chute assembly 150. A transition plate 114 bridges slide 112 and chute assembly 150. It will be understood by those skilled in the art that various transition components may be used to bridge feeder assembly 102 and chute assembly 150.

FIGS. 2 and 4A further depict a diverter/shield 116, which helps to keep mail exiting slide 112 from being directed incorrectly into an upper most chute 118 or diverter slide 158. Diverter/shield 116 will flip when it is desirable for mail to enter the upper most chute. In the embodiment pictured in the figures, diverter/shield 116 operates in conjunction with the uppermost diverter 118. Therefore, when it is desirable for mail to enter an uppermost chute 120, diverter/shield 116 will lift up when the uppermost diverter 118 is raised.

Figure 3:
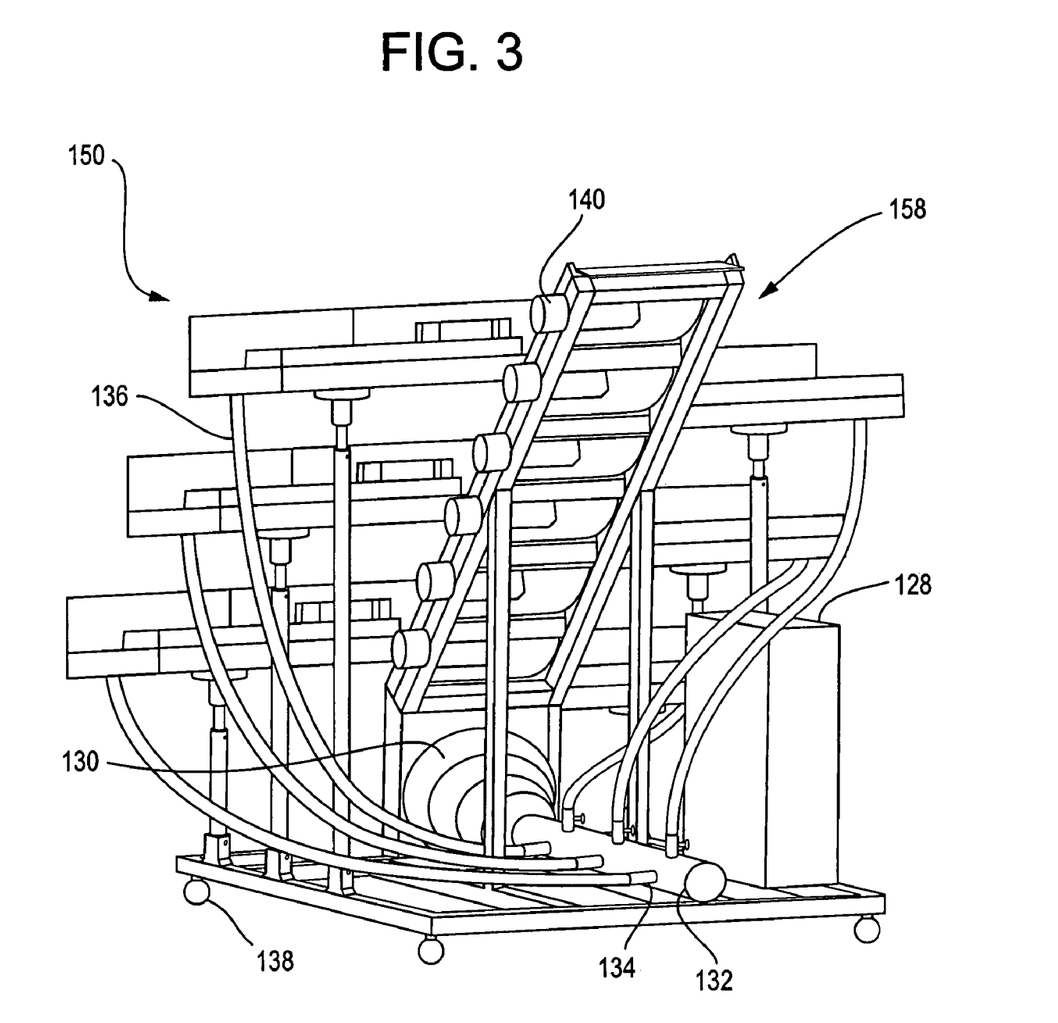
FIG. 3 depicts a compressor and fluid lines according to an illustrative embodiment of the invention.

In the illustrative embodiment FIGS. 3 and 4A there are a series of chute assembly diverters 118 that divert mail to any one of chutes 120. Diverters 118 are positioned on a diverter slide 158. Although chutes 120 are shown at a nearly right angle to diverter slide 158, this angle may be varied, for example, to accommodate different object types. Preferably, the diverters of 118 are shingled with the bottom surface of an upper diverter being in contact with a top surface of a lower diverter. This allows mail to move freely over diverters. It is noted that diverters need not be overlapping, and a span of the slide on which the diverters are positioned may be fixed. Diverter slide 158 can be positioned at various angles. The preferred angle may be selected based on such factors as the type of object being transported, the force of the fluid and the mechanism of imparting momentum to the objects. If sorting single sheets of paper, for example, diverter slide 158 may be at a smaller angle than if letters are being sorted. This will tend to keep the paper from sailing out of control. An illustrative angle range is about 40° to about 50° from horizontal.

In an illustrative embodiment, each of diverters 118 is operated by a solenoid controlled by a computer. Solenoids 140 that cause diverters 118 to open and close are shown in FIG. 3. When a lower diverter 118 is caused to open, a diverter 118 resting above it can flex to accommodate the movement of the lower shingle. This may be accomplished by the shingles being made of a flexible material, or by the upper shingle being allowed to move on a hinge. An open shingle 118 directs mail into a particular chute 120.

Chutes 120 may have chute guides 122 to guide mails along the chute toward a receptacle 126. Preferably, chute guides 122 are adjustable. Chute guides 122 are depicted in FIGS. 2 and 4B as being fastened by a screw having a knob on top. It will be understood by those skilled in the art that alternate methods, either adjusted or fixed, can be used to fasten chute guides 122 to chutes 120. It is also noted that chute guide 122 and chute 120 may be a single component. Chute guides will take on any shape necessary to direct the mails to the proper location. Chute guides may be made of one or more components and each component may be separately adjustable.

The embodiments depicted in FIGS. 2 and 4B also show chute barriers 124 that further guide the mail into the bins, and protect against mail exiting chutes 120 before reaching receptacles 126.

FIG. 3 is a view from the back of sorting section 150. It shows the housing component 128 that houses a power supply for the controller. The controller controls operation of diverters such as 118. Ring compressor 130 provides forced gas to create gas jets in chutes 120. A manifold 132 directs gas to a plurality of chutes 120. Tubing 136 is connected to manifold 132 and to a chamber in each chute 120. Tubing 136 is preferably half inch nylon tubing. Valves 134 are preferably present at each chute line to allow jets in the chute to be turned off and on. Valves 134 can be used to adjust the fluid force in each chute 120. If, for example, items were being sorted by size or weight, the force of fluid for each chute 120 may be varied accordingly. The power supply and controller housed in 120, together turn gates (diverters) on and off. It is noted that these components need not be housed together, and more than one controller or power supply may be incorporated into the assembly.

Chutes 120 are preferably angled downward from horizontal and also angled toward receptacles 126. This allows for the combination of gravity and the low friction gas cushion surface of the chute to propel the mail toward receptacles 126. For mail, an angle of approximately 3 degrees from the horizontal is sufficient to allow mail to properly move along chutes 120, with the ring compressor generating between 60 CFM and 100 CFM. (Preferably pneumatic fluid flow is continuously pressurized in each chute chamber @96 CFM minimum.) A further exemplary range of tilt for chutes 120 is 2–5 degrees from the horizontal, with another illustrative range being 1–7 degrees. It is understood, however, that the angle will depend on the type of objects being transported. In general, heavier objects require greater CFM of fluid and/or a greater tilt. Any incline of a transport surface or chute may be adjustable, or permanently fixed. The desirable pressure created by the fluid jets will also vary according to the type of object transported.

Preferably holes through which fluid is forced are drilled to be 0.006 inches in diameter. If a coating, such as Teflon® is used, the holes will likely reduce to approximately 0.0058 inches. Preferably there are four holes per square inch. An exemplary range of hole number is between two holes per square inch and eight holes per square inch. The hole size and spacing will depend on variables such as fluid pressure and object size.

Although for most applications, air is the preferred fluid to be forced through holes on transport or chute surfaces, other fluids may be used such as other gases. The fluids that are used can provide a transporting function as well as a treatment function, such as decontamination or fumigation. "Gas" as used herein means a gas consisting of a single elemental gas, a single compound gas, and any combination of one or more elemental or compound gases. It is further understood that if the fluid used is a liquid, a liquid recovery or drainage system should be used to collect the liquid and either feed it back into the system or direct it to a receptacle or drain. This can merely include a system of tubing, preferably initiating at a bin and ending at a drain or back into a chute.

Chute assembly 150 may be cascaded with other sorting assemblies. An example of how this may be accomplished is by extending a transport section from feeder assembly 102 horizontally above chute assembly 150 to another chute assembly. Mail could be diverted to the extension to the second sorter assembly or be diverted to chute assembly 150. Another way sorting assemblies may be cascaded is by having mail not sorted by chute assembly 150 reach a receptacle 126 below any of the other receptacles of 150. Mail entering this lower-most receptacle then would be raised by, for example, a lift or conveyor, to the top of a second chute assembly.

Chute assembly 150 may also be used in conjunction with existing sorters. It may be placed at a particular chute assembly receptacle area, and thereby be able to sort items further.

Chute assembly 150 is preferably portable or easily moveable. Chute assembly 150 may be positioned on wheels 138, for example as shown in FIG. 3, to facilitate use in conjunction with other sorters, or merely to facilitate placement at the end of any other transport or feeder assembly.

The invention may be embodied in a variety of ways, for example, a system, method, device, etc. Embodiments of the invention also include methods of transporting and sorting objects. Methods include those carried out on the assemblies described herein and other methods. Objects are transported along a path by floating them on a fluid cushion created by a fluid being forced toward the object along the path. Fluid may be forced in various directions to achieve the desired path and/or impart necessary momentum to the object. The method includes imparting a force to objects which may be by any method, for example mechanical means, gravity and magnetic devices. The force begins movement of the object on the fluid cushion surface. Various forces may also be applied along the transport path to direct the object.

Embodiments of the invention include a method for sorting objects in which objects are projected along fluid cushion paths and diverted to different paths and/or receptacles. In an exemplary embodiment mail are sorted by these methods.

Devices and methods of the present invention also lend themselves well to document sorting. Documents may include, for example, single-page documents and grouped documents. As used herein, "documents" is to be construed in its most broad sense and includes documents of different materials and types. Mail is also used broadly, and may include for example letter-size mail, flats and/or packages.

While the invention has been described by illustrative embodiments, additional advantages and modifications will occur to those skilled in the art. Therefore, the invention in its broader aspects is not limited to specific details shown and described herein. Modifications, for example, to the type of objects transported the size, positioning and specifications of transport surfaces may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A sorting system comprising:
   a plurality of chutes for transporting objects to selected locations, wherein the chutes include one or more openings through which a fluid may be forced to reduce friction between the objects and the chute;
   one or more diverters operatively aligned with the chutes for directing the objects toward selected chutes;
   a momentum mechanism for imparting forward motion to objects along the chutes.

2. The sorting system of claim 1 wherein chutes have a transport surface on which the objects are carried and the openings are at an angle other than 90° to the chute transport surface so that the forced fluid emitted from the openings provides the momentum mechanism.

3. The sorting system of claim 1 wherein the chutes are not in a horizontal plane so that the momentum mechanism is gravity.

4. The sorting system of claim 1 further comprising one or more receptacles, each positioned at the downstream end of a chute for receiving sorted objects.

5. The sorting system of claim 1 further comprising a slide, wherein the slide comprises at least one of the one or more diverters.

6. The sorting system of claim 1 further comprising a slide, wherein the slide comprises at least one of the one or more diverters configured to lift up or down to allow objects to enter a selected chute.

7. The sorting system of claim 6 wherein the diverters are shingled and a bottom surface of an upper diverter is in contact with a top surface of a lower proximate diverter.

8. The sorting system of claim 1 further comprising one or more chute guides.

9. The sorting system of claim 8 wherein the chute guides are adjustable.

10. The sorting system of claim 1 further comprising one or more chute barriers.

11. The sorting system of claim 1 further comprising a feeder assembly to move objects toward the chutes.

12. The sorting system of claim 11 further comprising a holding section at an intake end portion of the feeder assembly.

13. The sorting system of claim 1 further comprising a reading section upstream from the chutes in which information on the objects can be read and used to select chutes to transport the objects to.

14. The sorting system of claim 13 wherein the reading section comprises an optical character reader.

15. The sorting system of claim 13 wherein the reading section comprises a bar code reader.

16. The sorting system of claim 1 further comprising a controller to control the one or more diverters to direct objects into the chutes.

17. The sorting system of claim 1 further comprising a computer programmed to provide signals to a controller to operate the one or more diverters to direct objects to chutes selected by the program.

18. The sorting system of claim 1 further comprising a reject flap to direct objects to a reject receiving area if the object cannot otherwise be sorted by the system.

19. The sorting system of claim 1 further comprising a diverter shield disposed proximate a discharge end portion of the feeder assembly and a first shingled diverter to direct objects over the first shingled diverter and into a chute.

20. The sorting system of claim 1 configured to sort mail.

21. The sorting system of claim 1 configured to sort documents.

22. The sorting system of claim 1 wherein the fluid pressure is in the range of about 60 CFM to 100 CFM.

23. The sorting system of claim 3 wherein the chutes are angled downward from the horizontal about 1–7 degrees.

24. The sorting system of claim 3 wherein the chutes are angled downward from the horizontal about 2–5 degrees.

25. A method for sorting objects using an apparatus having a plurality of chutes the method comprising:
reading information on the objects;
determining, based on the information, to which chute the objects should be directed;
diverting the objects to the determined chutes;
reducing friction between the objects and a transporting surface of the chutes by providing a fluid cushion created by forcing a fluid through one or more holes on a transporting surface of the chute into a receiving area; and
imparting momentum to the objects to transport them along the chutes.

26. The method of claim 25 comprising using gravity to impart momentum to the objects.

27. The method of claim 25 comprising imparting momentum to the objects by directing the forced fluid toward a discharge end of the chutes.

28. The method of claim 25 comprising diverting the objects using diverters in a shingled configuration.

29. The method of claim 25 further comprising:
reading information on the objects and using the information to select chutes to transport the objects to.

30. The method of claim 29 wherein an optical character reader is used to read the information.

31. The method of claim 29 wherein a bar code reader is used to read the information.

32. The method of claim 25 further comprising providing signals from a computer to a controller to operate the one or more diverters to direct objects to chutes selected by the computer.

33. The method of claim 25 further comprising providing a reject flap to direct objects to a reject receiving area if the object cannot otherwise be sorted by the system.

34. The method of claim 25 wherein the method is used to sort mail.

35. The method of claim 25 wherein the method is used to sort documents.

36. The method of claim 25 comprising providing a fluid pressure in the range of about 60 CFM to 100 CFM.

37. The method of claim 25 comprising angling the chutes downward from the horizontal about 1–7 degrees.

38. The method of claim 25 comprising angling the chutes downward from the horizontal about 2–5 degrees.

39. The method of claim 5 wherein the fluid decontaminates the transported objects.

40. A method for sorting objects using an apparatus having a plurality of chutes the method comprising:
printing information from a database on the objects;
determining, based on the information from the database, to which chute the objects should be directed;
diverting the objects to the determined chutes;
reducing friction between the objects and a transporting surface of the chutes by providing a fluid cushion created by forcing a fluid through one or more holes on a transporting surface of the chute into a receiving area; and
imparting momentum to the objects to transport them along the chutes.

* * * * *